June 11, 1929.   L. B. CONANT   1,716,368
RUBBER HEEL
Filed Dec. 24, 1923   2 Sheets-Sheet 1
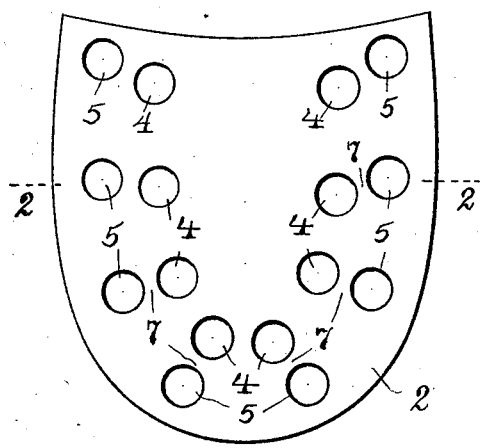
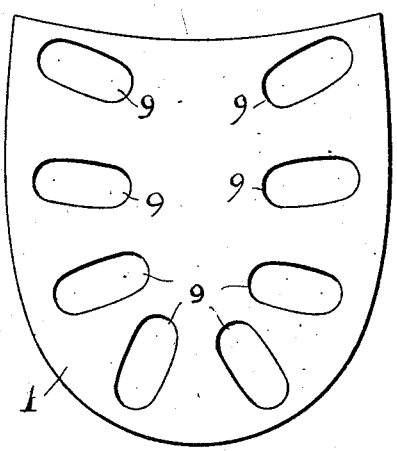
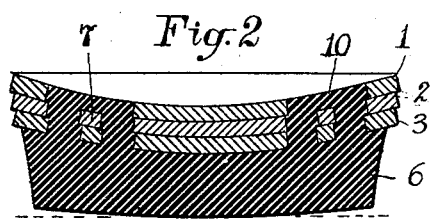
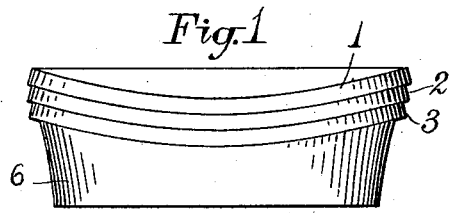
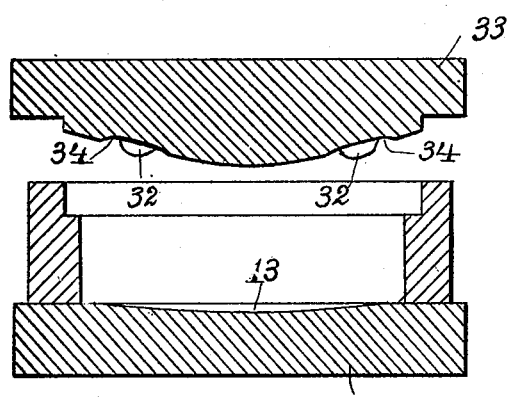
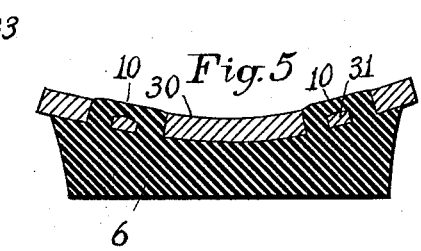
Inventor,
Leon B. Conant;
By A. B. Upham,
Attorney.

June 11, 1929.   L. B. CONANT   1,716,368
RUBBER HEEL
Filed Dec. 24, 1923    2 Sheets-Sheet 2
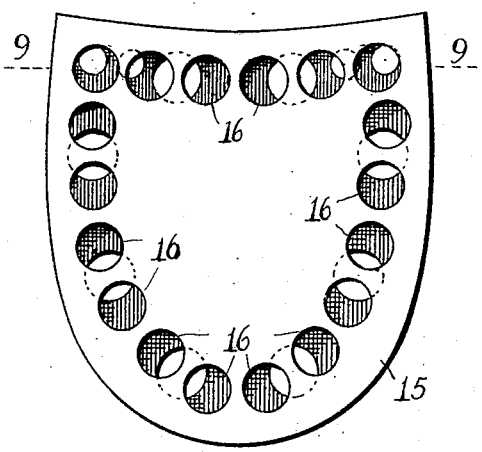
Fig. 7
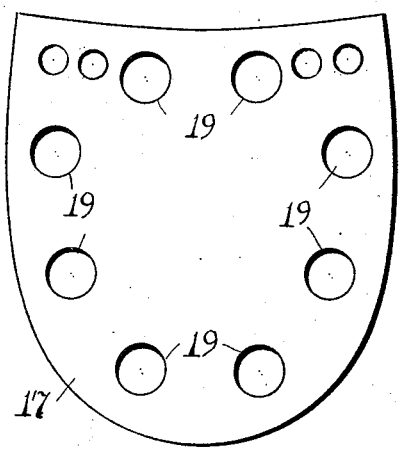
Fig. 8
Fig. 9
Fig. 10
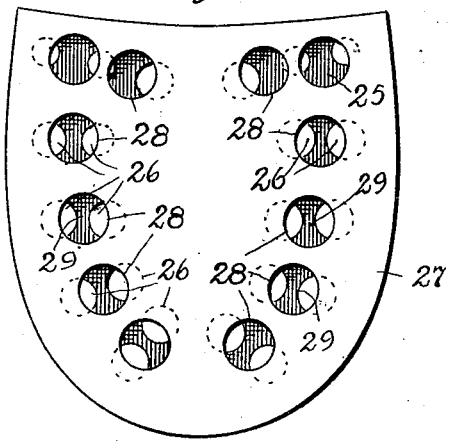
Inventor,
Leon B. Conant;
By A. B. Upham,
Attorney.

Patented June 11, 1929.

1,716,368

UNITED STATES PATENT OFFICE.

LEON B. CONANT, OF CAMBRIDGE, MASSACHUSETTS, ASSIGNOR, BY MESNE ASSIGNMENTS, TO STANDARD PATENT PROCESS CORPORATION, A CORPORATION OF MASSACHUSETTS.

RUBBER HEEL.

Application filed December 24, 1923. Serial No. 682,379.

This invention relates primarily to heels for boots and shoes, but it is also applicable to soles and other purposes where layers of fibrous material are to be provided with a rubber facing or tread; and it has for its object the effecting of improved means for binding the fibre and rubber together.

In order to promote this feature of my invention, I prefer to provide the ply or plies of fibrous material with holes so disposed as to receive integral portions of the rubber tread while the plies are being concaved and vulcanized to the rubber tread by combined heat and pressure.

In the drawings forming part of this specification, Fig. 1 is an end view of a heel embodying one form of my invention. Fig. 2 is a cross section on the line 2—2 in Fig. 3. Fig. 3 is a face view of one of the inner plies of fibrous material. Fig. 4 is a face view of the uppermost ply. Fig. 5 is a section of a heel having but one ply. Fig. 6 is a sectional view of a mold used in the production of the heels. Fig. 7 is a plan view of two plies in proper relative position prior to vulcanization. Fig. 8 is a face view of the under of these two plies. Fig. 9 is a section on the line 9—9 of Fig. 7. Fig. 10 is a plan view of a heel embodying another form of my invention.

In Figs. 1 and 2, there are illustrated three plies of fibrous material, 1, 2 and 3, but I do not restrict myself to this number, inasmuch as elsewhere I show heels with both one and two plies thereon. Attached to these plies is a rubber tread 6, the attaching means comprising sections of rubber integral with the tread and penetrating the holes with which the plies are provided. In this construction, the plies 2 and 3 are formed with numerous holes 5, 4 disposed in pairs to leave a neck 7 between each pair; and the ply 1 is given a number of holes 9 elongated and disposed to overlay holes 4, 5 below, each elongated hole 9 coming over a pair of the holes below.

Now, when the plies and rubber gum are introduced into the mold and subjected to the required heat and pressure, the gum is forced through all the holes in the plies and over the necks 7, as shown in Fig. 2, thus forming an arch or staple 10 over each neck.

When the plies are placed in the mold upon the rubber gum, they are entirely flat, but receive their concave form by the pressure and heat.

In my form of heel illustrated in Figs. 7 to 9, there are two plies of fibrous material, the upper one 15 being formed with a considerable number of holes 16 closely disposed near the periphery of the ply. The lower ply 17 is likewise supplied with holes 19 but staggered with respect to those above, as illustrated in Figs. 7 and 9, whereby when the rubber gum has been forced into and through all the holes the necks 20 of the under ply will be tied down by the rubber ties 21 passing over them and attaching the ply 17 securely to the rubber tread 22. When the combination heel is nailed to the shoe, the heads of the nails may bear against the ply 17 and hence attach both it and the upper ply to the shoe, and, of course, the tread as well.

In the construction of heel illustrated in Fig. 10, the lift or ply 25 next to the rubber tread is formed with pairs of holes 26 approximately radiating from a common center; and the ply 27 is provided with larger holes 28 disposed over the necks 29 separating the holes 26. This arrangement gives the same effect as is accomplished by the holes 4, 5 and 9 in Figs. 1 to 4, but all of the holes are circular; the elongated holes 9 necessitating expensive labor for the production of the dies therefor. It will be seen that the ply 25 is substantially like the ply 2 shown in Fig. 3, the main difference being that between the ply 27 and 1.

Fig. 5 illustrates a form of the invention wherein only a single lift or layer of fibrous material 30 is attached to the rubber tread 6 in substantially the same manner as above described. Instead, however, of employing a recess in an upper ply for the rubber tie 10, the neck 31 between each pair of holes 4, 5 is compressed, as by means of lugs 32 shown in Fig. 6, and the face of the back plate 33 slightly recessed, as at 34, to make room for the ties.

What I claim as my invention is:

1. A combination heel comprising a plurality of plies of fibrous material, and a rubber tread, the ply farther from the tread having numerous large holes through it, and the ply next to the tread having numerous smaller holes through it, these smaller holes being disposed in pairs, each pair being in communication with one of the larger holes in the other ply, whereby the rubber, having been forced into all said holes during the process of vulcanization, forms an attaching arch in each pair of small holes and the large one co-operating therewith.

2. A combination heel comprising a layer of rubber, two plies of fibrous material superposed on the layer of rubber, the fibrous material next to the rubber having a row of pairs of small holes through it, the two holes of each pair being near together, and the other ply of fibrous material having a corresponding row of large holes each of which communicates with the two holes of a pair beneath, the rubber filling all said holes and vulcanized therein.

3. A combination heel comprising a body of vulcanized rubber having a bottom tread face and a concave top-face, and a nail-engaging member consisting of a plurality of plies of fibrous material seated on said concave top-face and united to the latter by vulcanization, the lower portion of the fibrous material being provided with holes, and the upper portion with perforations, the said body being provided with integral anchoring staples equal in height to the thickness of said member and filling said holes and perforations and united by vulcanization within the areas thereof, whereby said nail-engaging member is tied to said rubber body.

4. A combination heel comprising a rubber tread, and a leather base vulcanized thereto, the portion of the leather adjacent the rubber having several pairs of closely disposed holes, and the portion of the leather farther from the rubber having a plurality of recesses equal to the number of said pairs, each recess communicating with one pair alone of said holes, and rubber integral with said tread filling said holes and recesses.

In testimony that I claim the foregoing invention, I have hereunto set my hand this 20th day of December, 1923.

LEON B. CONANT.